US006273129B1

(12) United States Patent
Chavand et al.

(10) Patent No.: US 6,273,129 B1
(45) Date of Patent: Aug. 14, 2001

(54) DEVICE FOR DISTRIBUTING A WORKING GAS AND INSTALLATION FOR SUPPLYING A WORKING GAS THAT IS EQUIPPED WITH SUCH A DEVICE

(75) Inventors: André Chavand, Eybens; Marc Bourgeois, Saint-Egreve; Norbert Fanjat, Montigny le Bretonneux, all of (FR)

(73) Assignee: L'Air Liquide, Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 0 days.

(21) Appl. No.: 09/217,573

(22) Filed: Dec. 21, 1998

(30) Foreign Application Priority Data

Dec. 24, 1997 (FR) .................................................. 97 16491

(51) Int. Cl.[7] ..................................................... G05D 7/06
(52) U.S. Cl. ........................................... 137/552; 700/282
(58) Field of Search .................................... 137/551, 552, 137/560; 700/282, 283, 284, 285

(56) References Cited

U.S. PATENT DOCUMENTS 4,430,959 2/1984 Ebata et al. .
4,646,224 * 2/1987 Randsburg et al. ............. 700/284 X
4,712,191 12/1987 Penna .
4,833,592 5/1989 Yamanaka .
4,866,594 9/1989 David et al. .
5,170,361 * 12/1992 Reed .................................... 700/283
5,521,824 * 5/1996 Eagan et al. ...................... 700/282 X
5,742,500 * 4/1998 Irvin ................................ 700/282 X

FOREIGN PATENT DOCUMENTS

71865/81 12/1980 (AU) .
29606594 7/1996 (DE) .
0 043 201 1/1982 (EP) .
WO 97/49099 12/1997 (WO) .

* cited by examiner

*Primary Examiner*—John Rivell
(74) *Attorney, Agent, or Firm*—Burns, Doane, Swecker & Mathis, L.L.P.

(57) ABSTRACT

The invention relates to a device for distributing a working gas, comprising a series of pipes connected to at least one source of working gas and to at least one outlet pipe for conveying the working gas towards a consumer station, functional members (25, 25A); and a command-control unit (35, 35A) comprising means (37) for communicating with the said functional members (35, 35A), means (39) for controlling tasks relating to the said functional members (25, 25A) and means (45) for operating the control means (39), which can be actuated by an operator of the distribution device. The operating means (45) comprise a touch-sensitive screen (47) which has main control zones associated with the control of corresponding tasks, which main control zones are delimited by graphics associated with the said tasks and displayed permanently on the said touch-sensitive screen (47).

28 Claims, 9 Drawing Sheets

DEVICE FOR DISTRIBUTING A WORKING GAS AND INSTALLATION FOR SUPPLYING A WORKING GAS THAT IS EQUIPPED WITH SUCH A DEVICE

This application claims priority under 35 U.S.C. §§119 and/or 365 to 97 16491 filed in France on Dec. 24, 1997; the entire content of which is hereby incorporated by reference.

BACKGROUND OF THE INVENTION

1. Field of the Invention

The invention relates to a device for distributing a working gas and to an installation for providing such gases, particularly for manufacturing circuits in the microelectronics industry.

2. Description of the Related Prior Art

The manufacture of electronic circuits requires the use of various so-called "working" gases such as, for example, $Cl_2$, $NH_3$, HCl, HBr, $NF_3$ or $WF_6$, etc, which are, for the most part, considered to be hazardous to man on account of their toxicity and/or their flammability.

This is why these gases are stored in pressurized gas cylinders arranged in pairs in gas-supply installations also known by the name of "gas cabinets". Such an installation comprises a safety cabinet with controlled extraction and a device for distributing the working gas that is located in the cabinet.

The distribution device comprises a series of pipes for supplying gas, flushing and extraction, connected to the two pressurized gas cylinders, valves arranged in the pipes for regulating the flow of the working gas, and gas-leak detectors and sensors for measuring the pressures prevailing in the pipe in order to monitor the operating status of the installation.

The valves are regulated and the various signals originating from the leak detectors and the pressure sensors are picked up and exploited by a command-control unit.

This command-control unit comprises, for example, a programmed controller and, connected to this, a display and control panel.

A block diagram of the installation is drawn on this panel. A great many luminous indicators, each associated with a specific alarm, are arranged in the panel for alerting to the alarms an operator responsible for monitoring the installation. In addition, switches for commanding the valves allowing the installation to be operated in manual mode are also installed on this panel. Furthermore, various displays mounted in the panel and controlled by the controller show the values of measurements picked up by the sensors.

Because of the numerous indicators, switches and displays, the display and control panel seems at first sight, complicated and not very user-friendly, which means that a rather lengthy learning process is needed in order to train an operator who will be responsible for monitoring the installation.

The invention aims to alleviate this drawback by providing a distribution device equipped with a more user-friendly display and control interface.

SUMMARY OF THE INVENTION

To this end, the subject of the invention is a device for distributing a working gas, comprising a series of pipes connected to at least one source of working gas and to at least one outlet pipe for conveying the working gas towards a consumer station, functional members, particularly valves arranged in the pipes and used to regulate the flow of the working gas through these pipes, and gas-leak detectors, and a command-control unit comprising means for communicating with the said functional members, means for controlling tasks relating to the said functional members and means for operating the control means, which can be actuated by an operator of the distribution device, which device is characterized in that the said operating means comprise a touch-sensitive screen which has main control zones associated with the control of corresponding tasks, which main control zones are delimited by graphics associated with the said tasks and displayed permanently on the said touch-sensitive screen.

The distribution device according to the invention may additionally have one or more of the following features:

- the touch-sensitive screen comprises, for at least one main control zone at least a secondary control zone associated with the said at least one main zone and relating to an instruction for controlling the task corresponding to the said at least one main control zone, the said at least one secondary control zone being delimited by a graphic associated with the said instruction and displayed on the said touch-sensitive screen only if the said corresponding main control zone is activated by an operator,
- the touch-sensitive screen comprises a first region reserved exclusively for the said main control zones and a second region distinct from the said first region and intended for the said secondary control zones,
- the touch-sensitive screen further comprises a third region distinct from the said first and second regions and reserved for displaying information relating to a main control zone activated by an operator,
- the operating means additionally comprise means for designating, on the touch-sensitive screen, a control zone that has been activated by an operator,
- one task controlled by the control means relates to managing and particularly to displaying on the touch-sensitive screen, alarms detected by the functional members, and one of the main control zones of the touch-sensitive screen is a zone for activating the displaying of the alarms picked up,
- when the device is equipped with measurement sensors, particularly for measuring the pressures prevailing in the pipes, one task controlled by the control means relates to evaluating the values of measurements picked up by the said measurement sensors and to displaying these values on the touch-sensitive screen, and one of the said main control zones is a zone for activating the displaying on the touch-sensitive screen of the measurement values picked up,
- when the device is equipped with measurement sensors, particularly for measuring the pressures prevailing in the pipes, the operating means comprise means for storing in memory a block diagram representing, in particular, the series of pipes of the device for distributing the working gas and the valves arranged in these pipes, one task controlled by the control means relates to evaluating the values of measurements picked up by the said sensors and to displaying on the touch-sensitive screen the block diagram of the distribution device, recorded in the said memory-storage means, together with the said values of measurements picked up by the sensors, and one of the said main control zones is a zone for activating the displaying on the touch-sensitive screen of the block diagram together with the values of measurements picked up.

In addition, the subject of the invention is an installation for distributing a working gas, characterized in that it comprises a first and second device for distributing working gas as defined hereinabove, which devices are arranged in series and whose command-control units communicate with each other, in that the second device is a functional member as far as the first device is concerned, in that one task of the control means of the first device relates to monitoring the operating status of the second device, which it considers as a functional member, and in that one of the said main control zones of the touch-sensitive screen of the first device is a zone for activating the displaying on the touch-sensitive screen of the first device, of information regarding the operating status of the second device.

The installation for distributing working gas may additionally have the following feature:

- when the second distribution device is equipped with measurement sensors, particularly for measuring the pressures prevailing in its pipes, the operating means of the first distribution device comprise means for storing in memory a block diagram representing, in particular, the series of pipes of the second device for distributing the working gas and the valves arranged in these pipes, one task controlled by the control means of the first distribution device relates to evaluating the values of measurements picked up by the sensors of the second distribution device and to displaying on the touch-sensitive screen of the first distribution device, the block diagram of the second distribution device together with the said values of measurements picked up by the sensors of the second distribution device, and one of the said main control zones of the touch-sensitive screen of the first device is a zone for activating the displaying on the touch-sensitive screen of the first distribution device of the block diagram of the second distribution device with the values of measurements picked up by the said measurement sensors of the second device In addition, the subject of the invention is an installation for supplying a working gas, comprising at least one source of a working gas under pressure, this source being placed in an isolation cabinet, characterized in that this installation comprises a distribution device as defined hereinabove, connected to the said at least one source and arranged in the said isolation cabinet, and in that the touch-sensitive screen of the distribution device is built into the exterior wall of the said cabinet.

The installation for supplying working gas may additionally have one or more of the following features:

- when the said source is a gas cylinder, one task controlled by the said control means of the distribution device relates to the commands for the cycles for flushing out the pipes before and after each operation of replacing an empty cylinder with a full cylinder, and one of the said main control zones of the touch-sensitive screen is a zone for activating the commands for the valves so as to activate the flushing cycles,
- when the installation comprises a first and a second source of working gas which sources are connected to the distribution device and are intended to supply the said distribution device alternately, one task controlled by the said control means of the distribution device relates to the commands to switch from the distribution device being supplied by the first source to its being supplied by the second source, and one of the said main control zones of the touch-sensitive screen is a zone for activating the commands for the valves in order to perform the said switching.

Other features and advantages of the invention will emerge from the following description, given by way of non-limiting example, with reference to the appended drawings, in which: distribution device relates to the commands to switch from the distribution device being supplied by the first source (5) to its being supplied by the second source, and one of the said main control zones of the touch-sensitive screen is a zone for activating the commands of the valves in order to perform the said switching.

BRIEF DESCRIPTION OF THE FIGURES OF THE DRAWING

Other features and advantages of the invention will emerge from the following description, given by way of non-limiting example, with reference to the appended drawings, in which.

DETAILED DESCRIPTION OF THE PREFERRED EMBODIMENTS

Figure 1:
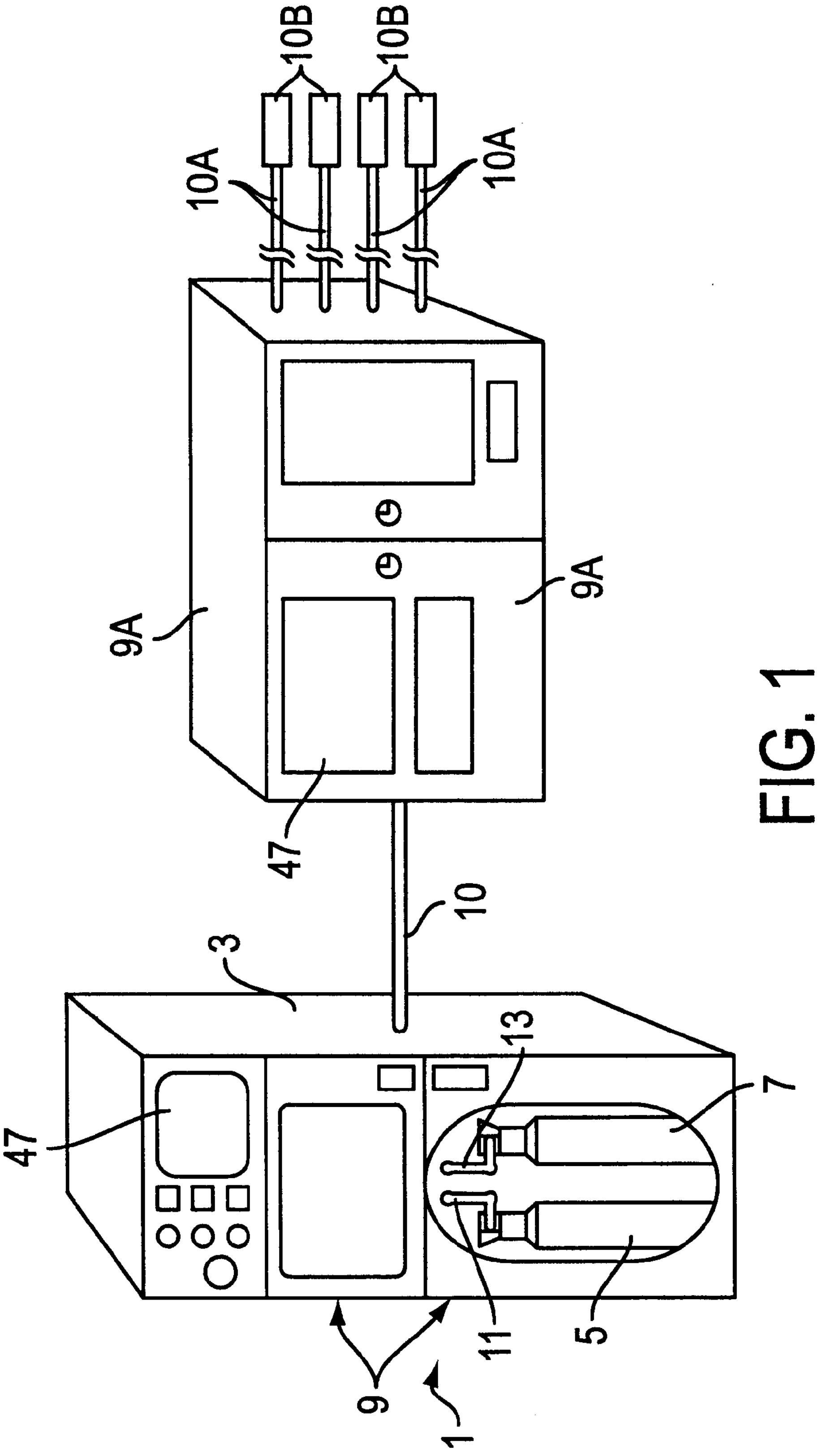
FIG. 1 is a diagrammatic view in perspective of an installation for supplying working gas equipped with a device according to the invention for distributing this gas.

FIG. 1 shows, as a diagrammatic view in perspective with cutaway at its lower part, an installation 1 for supplying a working gas, particularly gases such as, for example, $Cl_2$, $NH_3$, HCl, HBr, $NF_3$ or $WF_6$, etc, intended to supply one or more stations that consume these gases, more specifically stations for the manufacture of microelectronic circuits.

This installation 1 comprises an isolation cabinet 3 in which there are installed, on the one hand, as can be seen in the figure by virtue of the cutaway, two cylinders 5 and 7 of a pressurized working gas and, on the other hand, a device 9 for distributing the working gas, of which the pipes 11 and 13, connected respectively to the cylinders 5 and 7, can be seen in this figure.

The installation 1 is connected by its outlet pipe 10 to a second device 9A for distributing working gas which serves to supply the working gas via its outlet pipes 10A to several consumer stations 10B at the same time.

Figure 2:
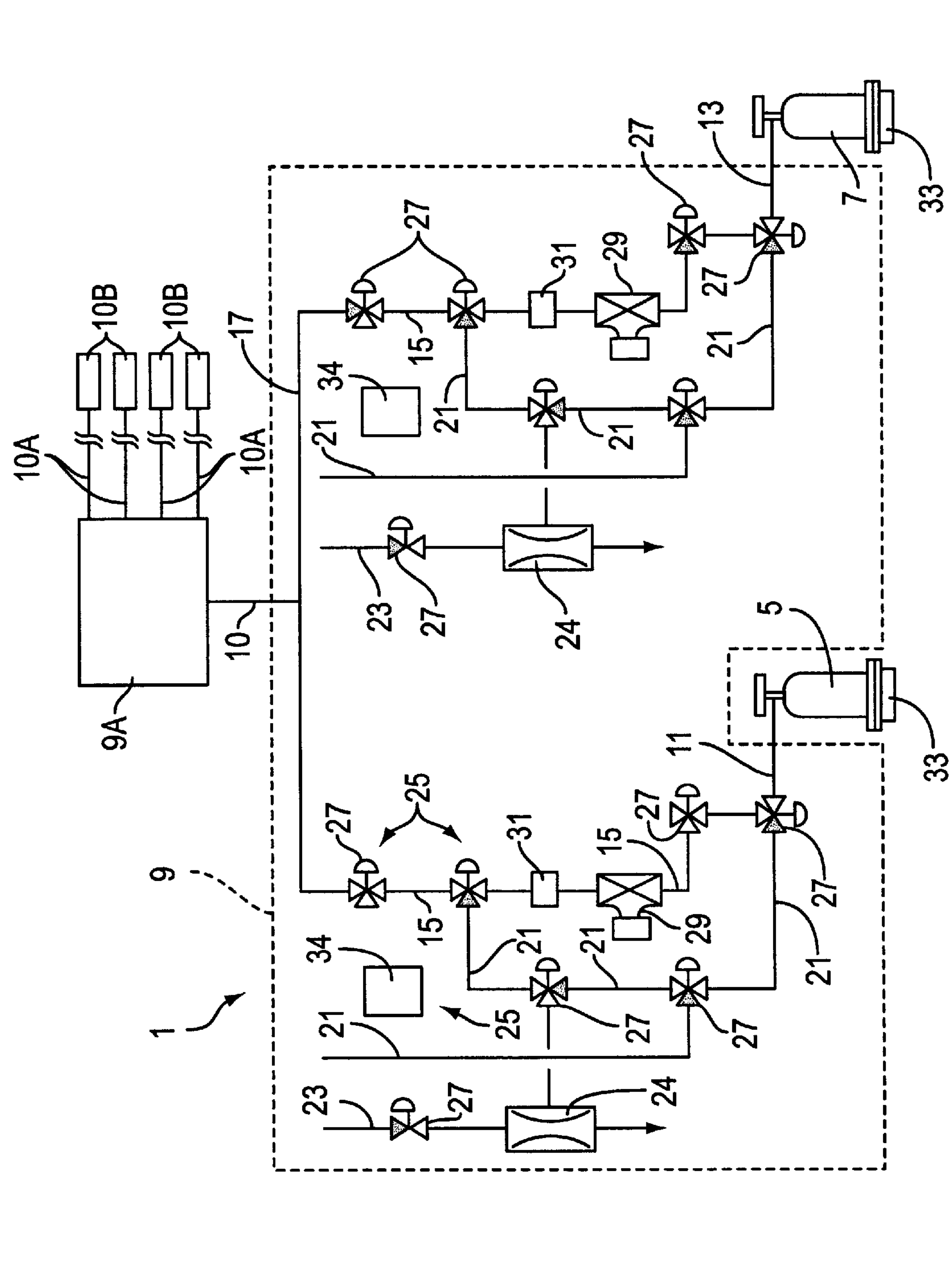
FIG. 2 is a diagram of the pipes of the working gas distribution device mounted in the installation of FIG. 1.

As can be seen in FIG. 2, the device 9 for distributing the working gas of the installation 1 comprises a series of pipes comprising, in particular, for each cylinder 5, 7, a main pipe 15 connected via a common pipe 17 to the outlet pipe 10 for conveying the working gas to the consumer stations 10B, flushing pipes 21 and gas-extraction pipes 23 for obtaining a partial vacuum in the cabinet 3, by virtue of the activation of a vacuum generator 24.

To provide for the possibility of regulating the various flows of gas in the various pipes and of monitoring the operating status of the distribution device 9, the latter comprises functional members 25 such as shut-off valves 27 and regulating valves 29 arranged in the various pipes 15, 17, 21 and 23, sensors 31 for measuring the pressures prevailing, in particular, in the main pipes 15, balances 33 for weighing the cylinders 5 and 7 to determine how full the cylinders are, when these cylinders are filled with a liquefied gas, or even gas leak detectors 34 arranged in the cabinet 3 of the installation.

Figure 3:
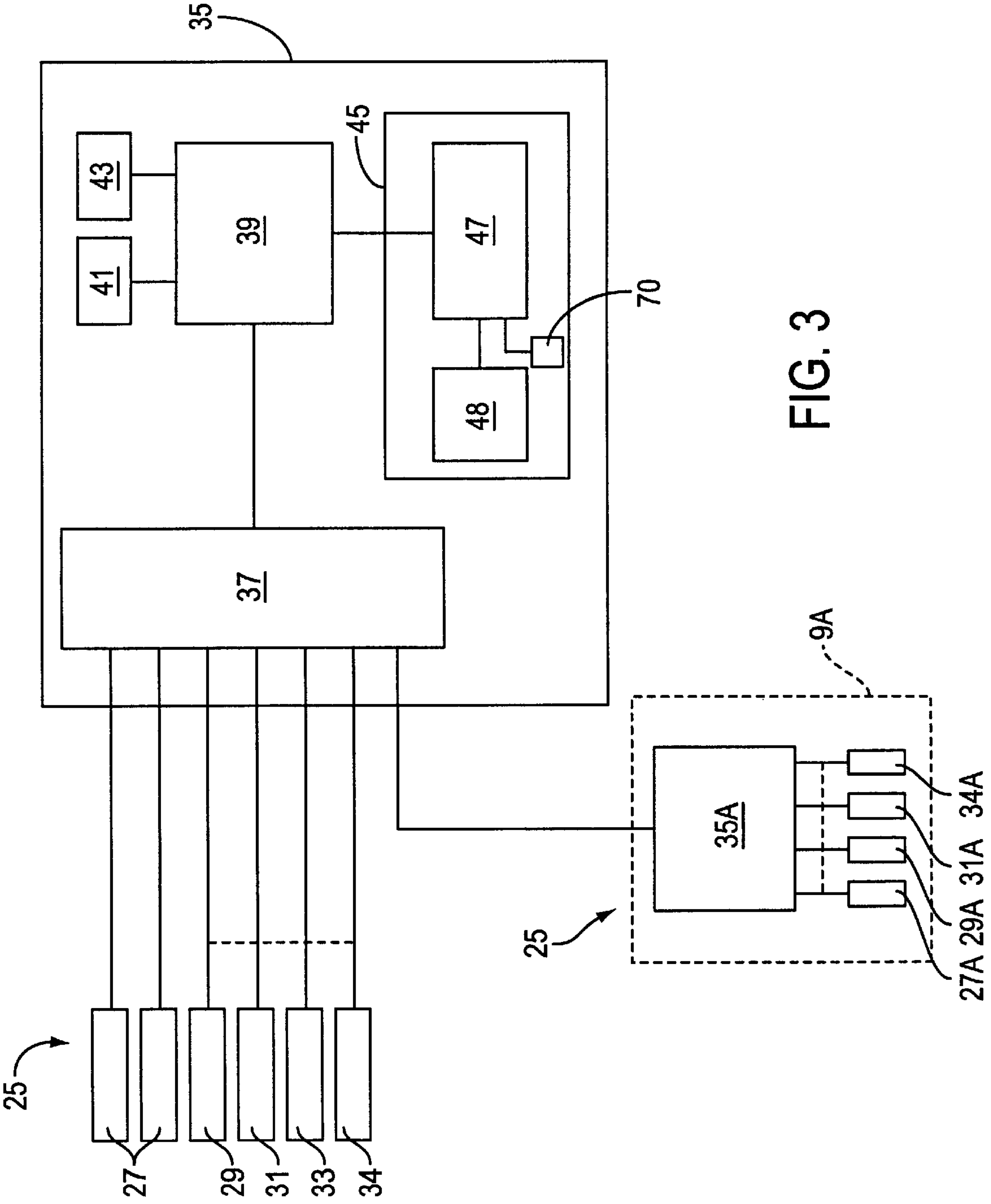
FIG. 3 is a block diagram of a command and control unit for the distribution device according to the invention.

As can be seen in the diagram of FIG. 3, these functional members 25 are all connected to a command-control unit 35.

This unit 35 for commanding-controlling the functional members 25 comprises means 37 for communicating with these functional members 25 and, connected to these means 37, means 39 for controlling various tasks relating to the functional members 25, these tasks being stored in a task memory 41.

Such tasks involve, for example, comparing the values of measurements picked up by the sensors 31 and/or by the balances 33 with predefined threshold values recorded in a threshold memory 43, generating an alarm signal if one of the measured values crosses the associated threshold and, possibly, depending on the predefined priority level of the alarm, partially or completely shutting down the installation 1. In this case, the means 39, via the communication means 37, command the closure of some of the valves of the installation.

Another task involves, for example, controlling the valves 27 and 29 where, for example, the cylinder 5 supplying the device 9 is practically empty and the supply to the distribution device 9 then needs to be switched to the cylinder 7, or vice versa.

Yet another task relates to detecting gas leaks using the detectors 34 and, if such a leak is detected, to generating an alarm signal and partially or completely shutting down the installation 1.

Furthermore, a specific functional member 25 with which a special task is associated is formed by the second distribution device 9A of which only the command-control unit 35A and functional members 25A connected to this unit 35A are depicted in FIG. 3.

Given that the structure of the device 9A is similar to the structure of the device 9 insofar as it too comprises a series of pipes and functional members 25A such as valves 27A and 29A arranged in these pipes for regulating the flow of the working gas, sensors 31A for measuring the pressures prevailing in the pipes and gas leak detectors 34A, the particular arrangement of the pipes and valves will not be described in further detail.

However, it should be noted that the command-control unit 35A of the device 9A is identical to the command-control unit 35 of the distribution device 9.

As is depicted in FIG. 3, the command-control unit 35A is connected to the communication means 37 of the unit 35.

A specific task controlled by the means 39, via the means 37, relates to monitoring the operating status of the device 9A.

In particular, the pressure values measured by the sensors 31A and any leaks detected by the detectors 34A are transmitted to the control means 39.

The various tasks may just as easily be controlled by the control means 39 in parallel as they can in turn, or they may merely be controlled upon detection of an event such as, for example, the detection of an alarm.

In addition, the command-control unit 35 comprises means 45 of operating the control means 39, allowing an operator, for example, to activate a task or to choose and define certain parameters needed for controlling a task.

For this, the operating means 45 comprise a touch-sensitive screen 47 and means 48 of storing in memory diagrams or graphics intended to be displayed on the touch-sensitive screen 47.

As can be seen in FIG. 1, the touch-sensitive screen 47 is built into the exterior wall of the upper part of the cabinet 3 of the installation 1 so that it is clearly visible and accessible to an operator responsible for monitoring the installation.

Figure 4:
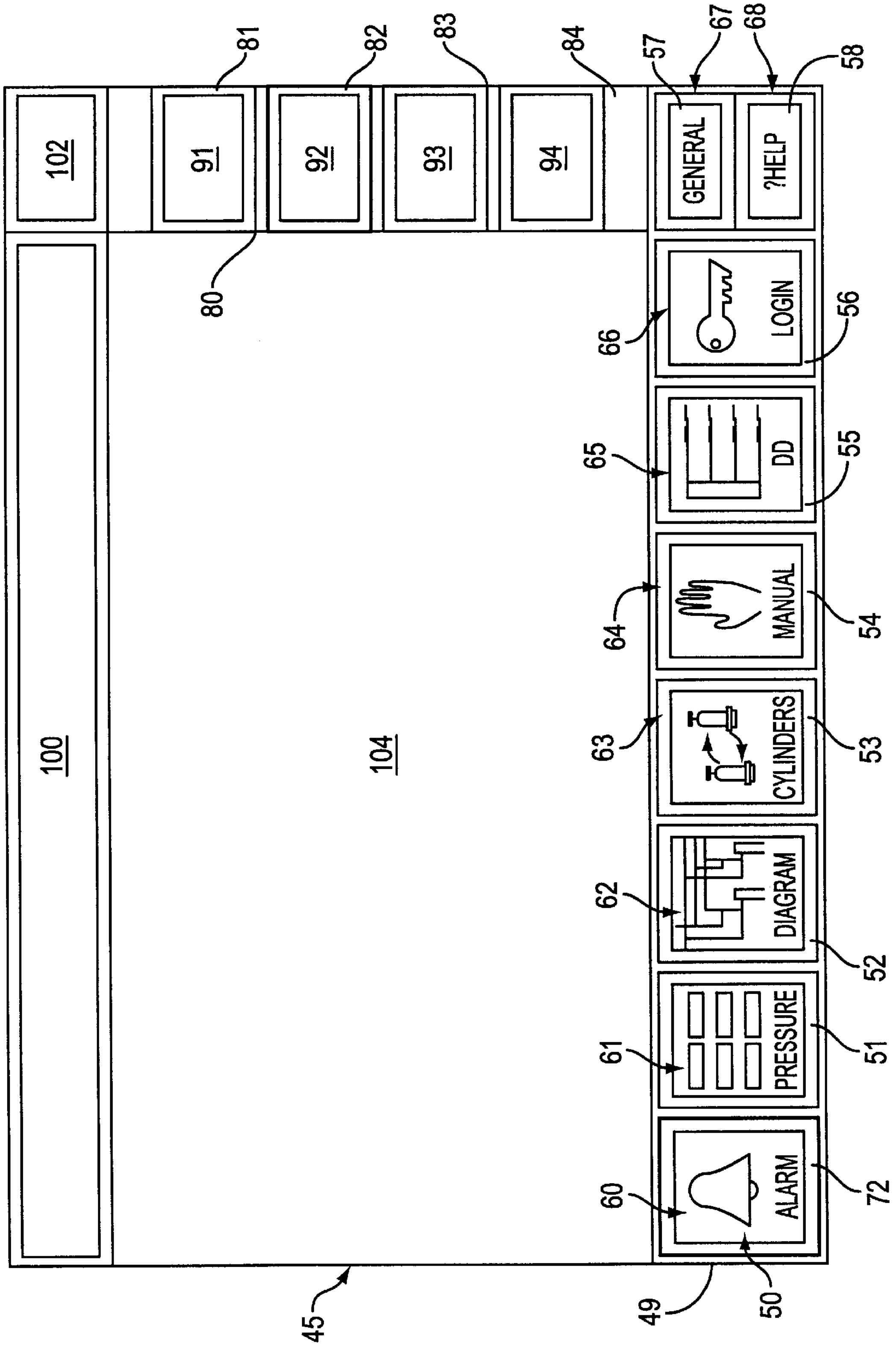
FIG. 4 is a diagram of the touch-sensitive screen of the device according to the invention.

The touch-sensitive screen is depicted in greater detail in FIG. 4. With reference to this FIG. 4, the touch-sensitive screen 47 comprises, at the bottom, a first region 49 in which graphics 50, 51, 52, 53, 54, 55, 56, 57 and 58 are permanently displayed. Each graphic 50 to 58 delimits on the touch-sensitive screen 47 an associated main control zone respectively bearing the reference numerals 60 to 68, that is to say zones by means of which an operator responsible for monitoring the installation 1, by bringing his finger into contact with the touch-sensitive screen 47, input into the operating means 45 a command relating to a predetermined task.

This first region 49 is strictly reserved for these main control zones 60 to 68 with the permanently-displayed associated graphics 50 to 58. These main control zones 60 to 68 are permanently receptive to receiving a command from the operator. This is particularly advantageous when the means 39 control various tasks in parallel, because the operator can gain access to operating a task simply by activating the main control zone associated with this task.

For certain specific tasks it is necessary to give the operator the possibility of choosing or of entering, once the corresponding main zone has been activated, a parameter or a command instruction relating to this specific task.

For this purpose, the touch-sensitive screen 47 also comprises, on its right-hand side as seen in FIG. 4, a second region 80 distinct from the first region 49, in which there are displayed, depending on the task activated, graphics 81, 82, 83 and 84 which, in this figure, are depicted merely as boxes. These graphics 81 to 84 delimit secondary control zones respectively bearing the reference numerals 91 to 94. These secondary control zones allow the operator to perform various operations relating to the specific task activated.

Of course, the graphics 81 to 84 and also the operations that the operator can enter into the operating means 45 change, depending on the main control zone and thus on the task activated.

Furthermore, as can be seen in FIG. 3, the operating means further comprise means 70 for designating, on the touch-sensitive screen 47, a main or secondary control zone that has been activated by an operator. As is depicted in FIG. 4, once a control zone has been activated, for example once the zone 60 has been activated, the designation means 70 cause there to be displayed on the touch-sensitive screen 47, for example, a coloured box 72 surrounding the activated main control zone 60. In this way, the operator is always informed of the active task displayed on the screen.

Furthermore, the touch-sensitive screen 47 comprises, at the top, a third region 100, distinct from the first 49 and second 80 regions, which is reserved for displaying information relating to a main control zone activated by the operator.

To the right of this region 100, above the region 80, is delimited a zone 102 for displaying the current time.

The rest of the touch-sensitive screen 47, the region 104, which is surrounded by the regions 100, 80 and 49, is intended mainly for displaying information relating to the control of a task controlled by the means 39 when a main control zone associated with this task has been activated by the operator.

Advantageously, when no secondary control zone is associated with a specific task activated by a main control zone, the zone 104 is enlarged and also comprises the region 80.

Various examples of the operation of the device 9 using the touch-sensitive screen 47 are described below.

Figure 5:
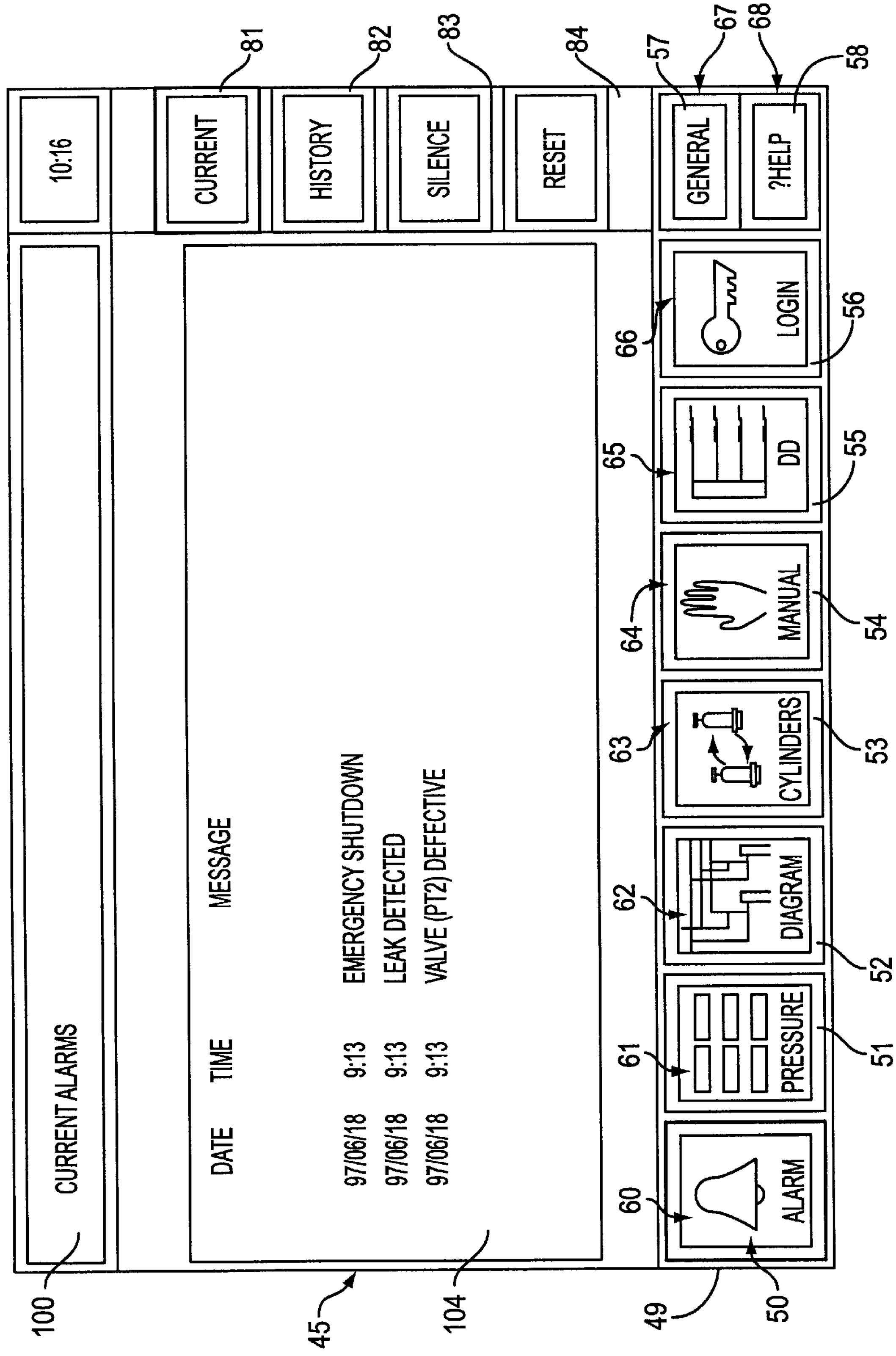
FIG. 5 is a first example of a display on the touch-sensitive screen.

For example, in FIG. 4, the graphic 50 shows a bell below which there is written "alarm", and delimits the main control zone 60 relating to a task of managing and displaying alarms controlled by the means 39 as was described above. If an operator activates zone 60, then the alarms picked up are displayed in the zone 104 of the touch-sensitive screen 47, as depicted in FIG. 5.

In addition, graphics 81 to 84 delimit secondary control zones 91 to 94 relating to the management and display of the alarms are displayed on the screen. For example, activating the secondary zone 92 delimited by the graphic 82 allows a history of the alarms to be displayed.

Figure 6:
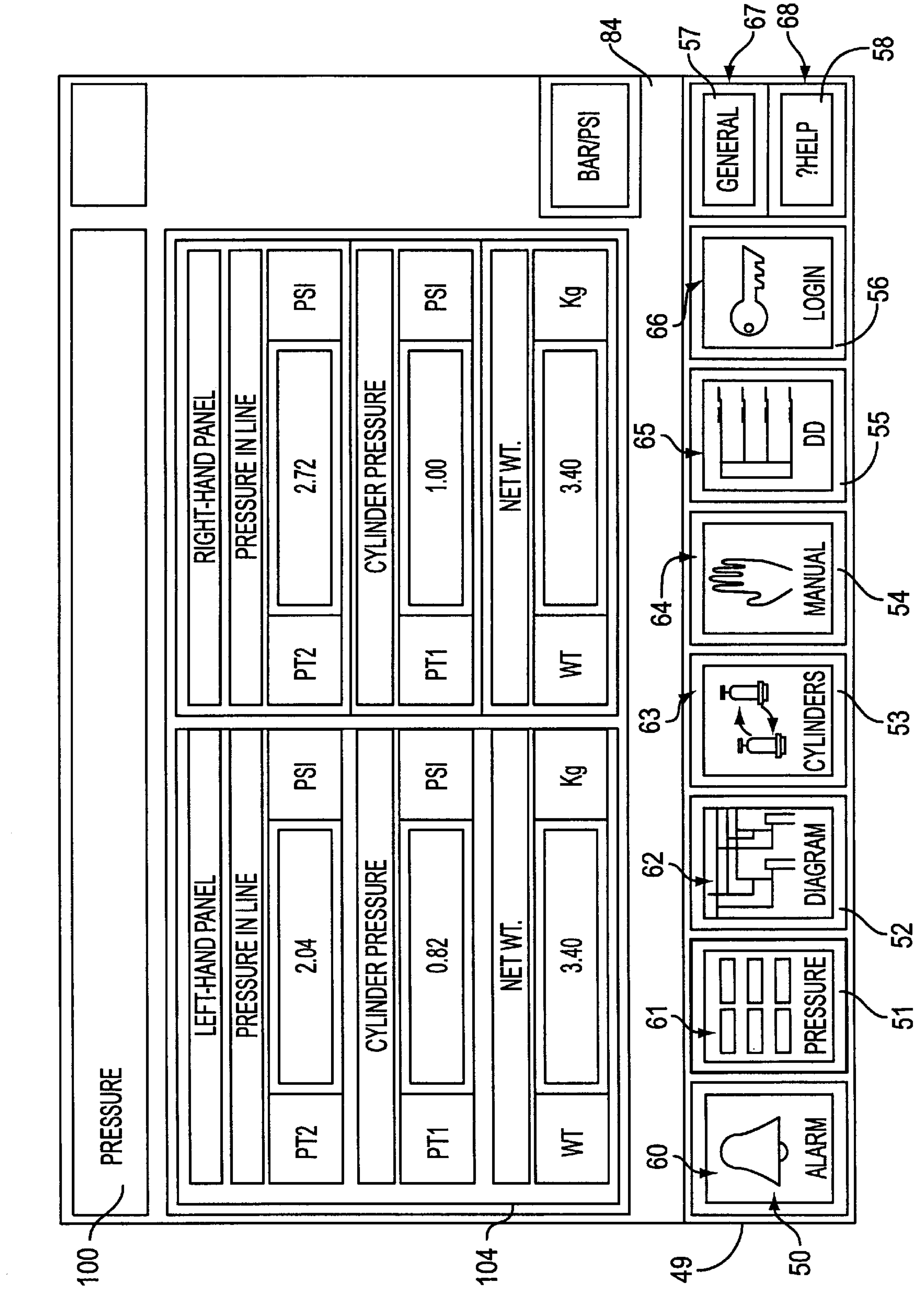
FIG. 6 is a second example of a display on the touch-sensitive screen.

The graphic 51 in FIG. 4 shows displays with numerical values under which is written "pressure". This graphic 51 delimits the main control zone 61 associated with the activation of a task relating to picking up the pressure and weight values measured by the sensors 31 and the balances 33, and to displaying these values on the touch-sensitive screen 47 as is shown in FIG. 6.

Figure 7:
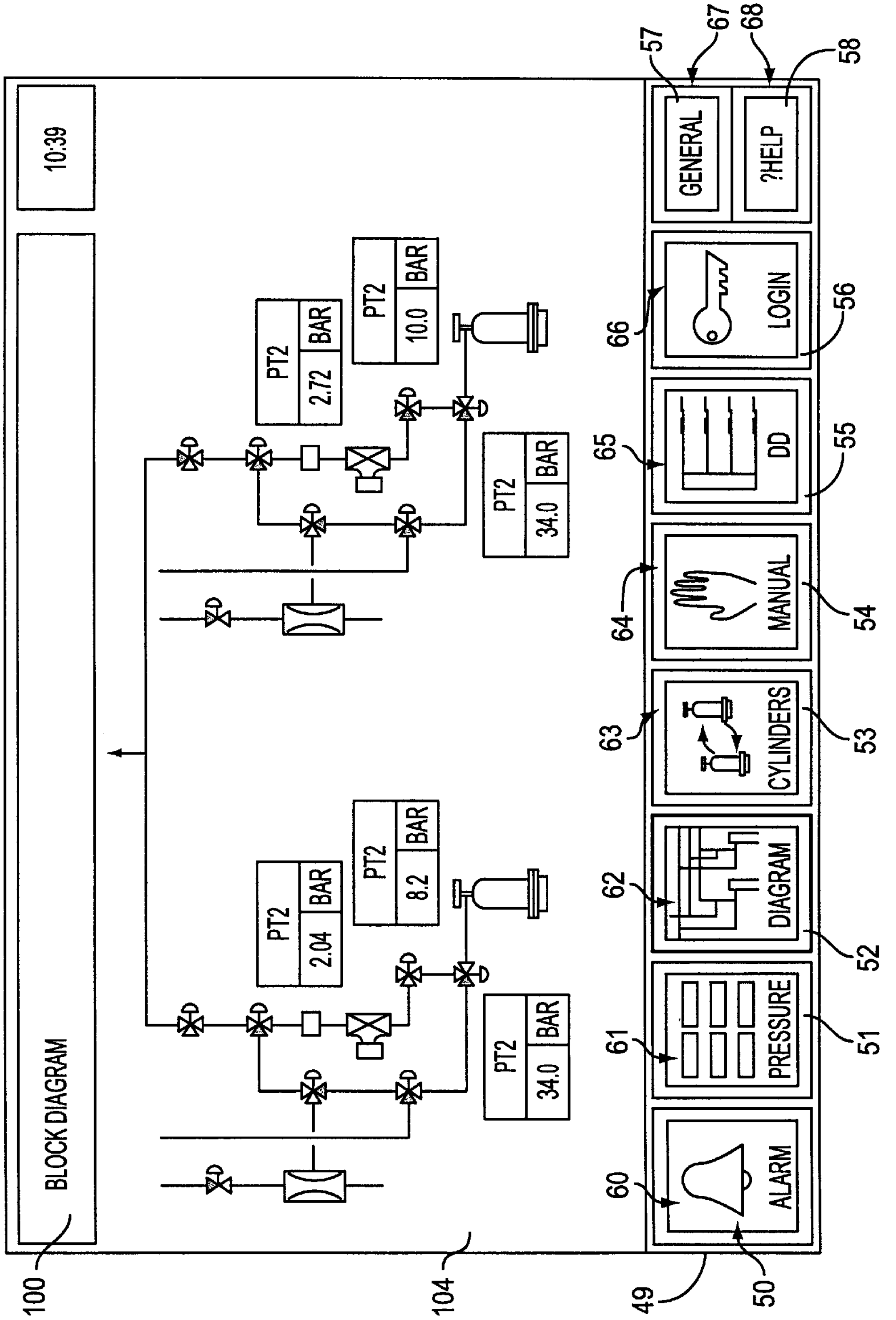
FIG. 7 is a third example of a display on the touch-sensitive screen.

The graphic 52 in FIG. 4 shows pipes and cylinders connected to them underneath which is written "diagram". This graphic 52 delimits the main control zone 62 associated with the activation of a task relating to picking up the values of measurements measured by the sensors 31 and the balances 33 and to displaying on the touch-sensitive screen a block diagram of the device, this diagram being recorded in the memory storage means 48, together with the values of measurements picked up, as is shown in FIG. 7.

Figure 8:
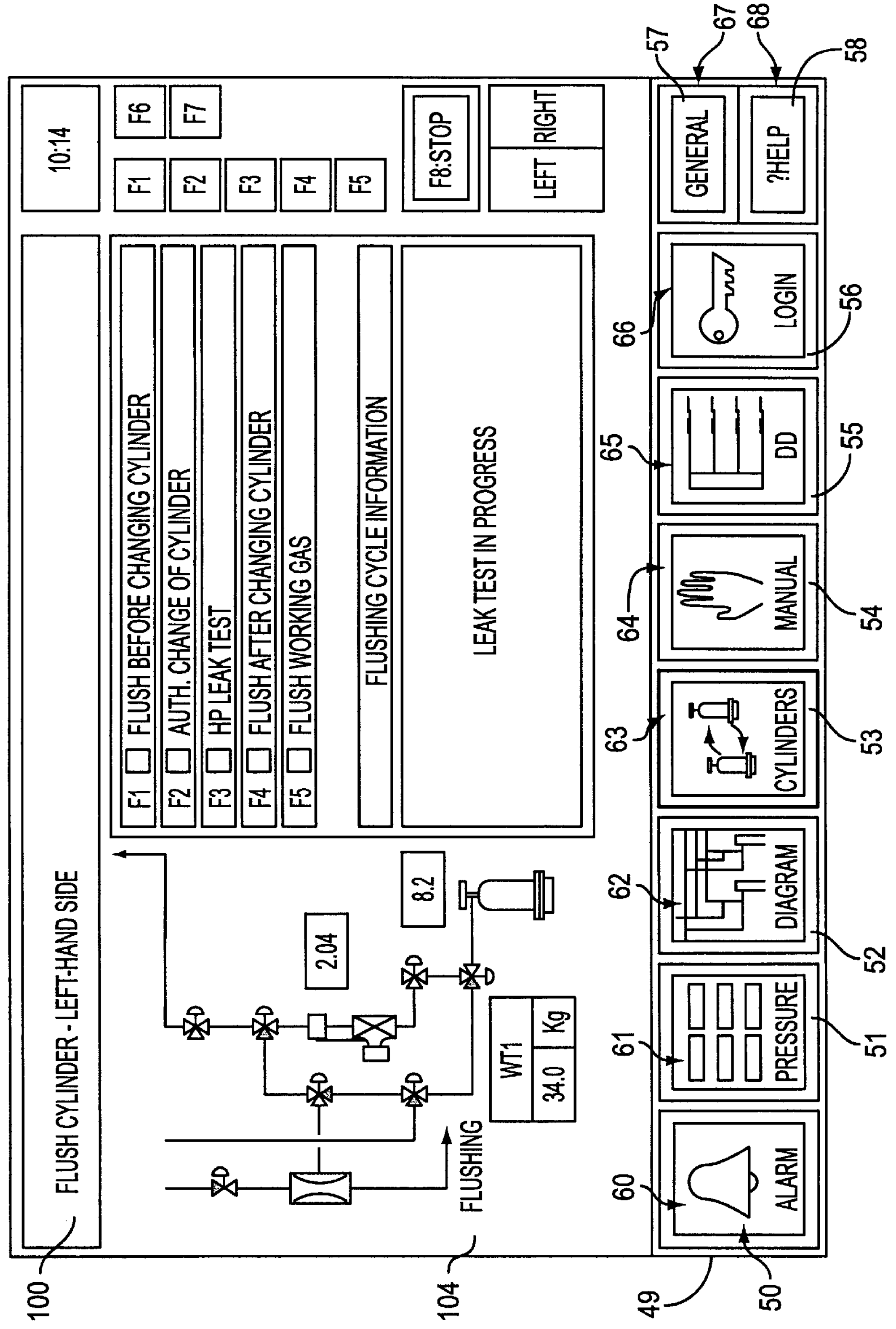
FIG. 8 is a fourth example of a display on the touch-sensitive screen.

The graphic 53 in FIG. 4 shows a gas supply installation (a gas cabinet) with cylinders and arrows signifying replacement of cylinders, below which is written "cylinders". This graphic 53 delimits the main control zone 63 associated with the activation of two tasks. One of these tasks relates to the controlling of the valves in order to perform the flushing cycles and leak checks that are necessary each time before and after an empty cylinder is replaced by a full cylinder. The other task relates to the commands for the valves arranged in the pipes so as to switch from the distribution device 9 being supplied by one of the cylinders 5 or 7 to its being supplied by the other cylinder 7 or 5. An example of the screens displayed when the zone 63 is activated is depicted in FIG. 8. This shows, on the left-hand side, the block diagram of the part of the installation 1 affected by the change of cylinder and, on the right-hand side, the various flushing and leak-check cycles which can be activated by the operator, for example by means of the secondary control zones delimited by boxes in which the codes F1 up to F5 are written. The supply can be switched over by activating the control zones in which the words "left" and "right" are written.

Figure 9:
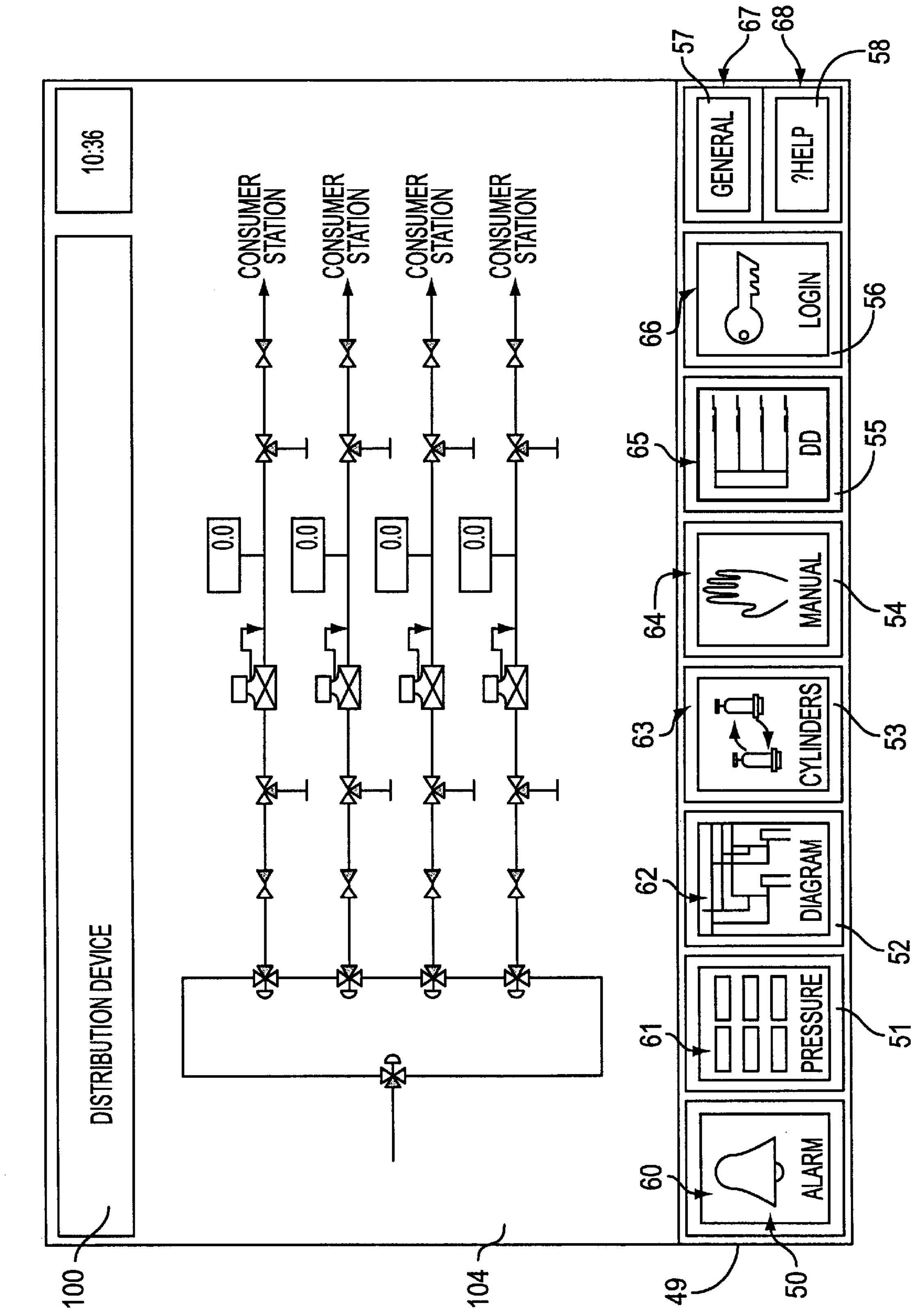
FIG. 9 is a fifth example of a display on the touch-sensitive screen.

The graphic 55 in FIG. 4 shows pipes of a distribution device under which there is written "DD" (for distribution device). This graphic 55 delimits the main control zone 65 associated with the activation of a task relating to the evaluation of the values of measurements picked up by the sensors 31A of the distribution device 9A, placed in series with the device 9 of the installation 1, and to the displaying on the touch-sensitive screen, of a block diagram of the device 9A, recorded in the memory-storage means 48, together with the values of measurements picked up by the sensors 31A, as is shown in FIG. 9.

Through the examples described it may be seen that the use of the touch-sensitive screen 47 in the context of devices for distributing a working gas and of installations for supplying such a gas which are equipped with these devices substantially simplifies the work of the operators responsible for monitoring them and allows them to avoid a lengthy and costly training period.

What is claimed is:

1. A device for distributing a working gas, comprising:

a series of pipes connected to at least one source of working gas and to at least one outlet pipe for conveying the working gas towards a consumer station;

functional members including valves arranged in the pipes and used to regulate the flow of the working gas through these pipes, and including gas-leak detectors; and a command-control unit comprising means for communicating with said functional members, means for controlling tasks relating to said functional members and means for operating the control means, which can be actuated by an operator of the distribution device, wherein said means for controlling tasks including means for managing alarms or controlling valves; and wherein said operating means comprise a touch-sensitive screen which has main control zones associated with the control of corresponding tasks, which main control zones are delimited by graphics associated with said tasks and displayed permanently on a first region of said touch-sensitive screen.

2. A device according to claim 1, wherein the touch-sensitive screen comprises, for at least one main control zone at least a secondary control zone associated with said at least one main zone and relating to an instruction for controlling the task corresponding to said at least one main control zone, said at least one secondary control zone being delimited by a graphic associated with said instruction and displayed on a second region of said touch-sensitive screen only if said corresponding main control zone is activated by an operator.

3. A device according to claim 2, wherein the touch-sensitive screen comprises a first region reserved exclusively for said main control zones and a second region distinct from said first region and intended for said secondary control zones.

4. A device according to claim 3, wherein the touch-sensitive screen further comprises a third region distinct from said first and second regions and reserved for displaying information relating to a main control zone activated by an operator.

5. A device according to claim 1, wherein the operating means additionally comprise means for designating, on the touch-sensitive screen of a control zone that has been activated by an operator.

6. A device according to claim 1, wherein one task controlled by the control means relates to managing and particularly to displaying on the touch-sensitive screen alarms detected by the functional members and in that one of the main control zones of the touch-sensitive screen is a zone for activating the displaying of the alarms picked up.

7. A device according to claim 1, further comprising measurement sensors for measuring the pressures prevailing in the pipes wherein one task controlled by the control means relates to evaluating the values of measurements picked up by said measurement sensors and to displaying these values on the touch-sensitive screen, and in that one of said main control zones is a zone for activating the displaying on the touch-sensitive screen of the measurement values picked up.

8. A device according to claim 1, further comprising measurement sensors for measuring the pressures prevailing in the pipes, wherein the operating means comprise means for storing in memory a block diagram representing, in particular, the series of pipes of the device for distributing the working gas and the valves arranged in these pipes, in that one task controlled by the control means relates to evaluating the values of measurements picked up by said sensors and to displaying on the touch-sensitive screen the block diagram of the distribution device, recorded in said memory-storage means, together with said values of the measurements picked up by the sensors, and in that one of said main control zones is a zone for activating the displaying on the touch-sensitive screen of the block diagram together with the values of measurements picked up.

9. An installation for distributing a working gas, comprising:

a first and a second device for distributing working gas according to claim 1, which devices are arranged in series and whose command-control units communicate with each other, in that the second device is a functional member as far as the first device is concerned, in that one task of the control means of the first device relates to monitoring the operating status of the second device, which it considers as a functional member, and in that one of said main control zones of the touch-sensitive screen of the first device is a zone for activating the displaying on the touch-sensitive screen of the first device, of information regarding the operating status of the second device.

10. An installation according to claim 9, wherein the second distribution device further comprises measurement sensors for measuring the pressures prevailing in its pipes, wherein the operating means of the first distribution device comprise means for storing in memory a block diagram representing the series of pipes of the second device for distributing the working gas and the valves arranged in these pipes, in that one task controlled by the control means of the first distribution device relates to evaluating the values of measurements picked up by the sensors of the second distribution device and to displaying on the touch-sensitive screen of the first distribution device, the block diagram of the second distribution device together with said values of measurements picked up by the sensors of the second distribution device, and in that one of said main control zones of the touch-sensitive screen of the first device is a zone for activating the displaying on the touch-sensitive screen of the first distribution device of the block diagram of the second distribution device with the values of measurements picked up by said measurement sensors of the second device.

11. An installation for supplying a working gas, comprising:

at least one source of a working gas under pressure, this source being placed in an isolation cabinet;

a distribution device according to claim 1, connected to said at least one source and arranged in said isolation cabinet and in that the touch-sensitive screen of the distribution device is built into the exterior wall of said cabinet.

12. An installation according to claim 11, wherein said source is a gas cylinder, and wherein one task controlled by said control means of the distribution device relates to the commands of the cycles for flushing out the pipes before and after each operation of replacing an empty cylinder with a full cylinder, and in that one of said main control zones of the touch-sensitive screen is a zone for activating the commands for the valves so as to activate the flushing cycles.

13. An installation according to claim 11, comprising a first and a second source of working gas which sources are connected to the distribution device and are intended to supply said distribution device alternately, wherein one task controlled by said control means of the distribution device relates to the commands to switch from the distribution device being supplied by the first source to its being supplied by the second source, and in that one of said main control zones of the touch-sensitive screen is a zone for activating the commands for the valves in order to perform said switching.

14. A device according to claim 2, wherein the operating means additionally comprise means for designating, on the touch-sensitive screen of a control zone that has been activated by an operator.

15. A device according to claim 3, wherein the operating means additionally comprise means for designating, on the touch-sensitive screen of a control zone that has been activated by an operator.

16. A device according to claim 4, wherein the operating means additionally comprise means for designating, on the touch-sensitive screen of a control zone that has been activated by an operator.

17. A device according to claim 2, wherein the operating one task controlled by the control means relates to managing and particularly to displaying on the touch-sensitive screen, alarms detected by the functional members, and in that one of the main control zones of the touch-sensitive screen is a zone for activating the displaying of the alarms picked up.

18. A device according to claim 3, wherein the operating one task controlled by the control means relates to managing and particularly to displaying on the touch-sensitive screen, alarms detected by the functional members, and in that one of the main control zones of the touch-sensitive screen is a zone for activating the displaying of the alarms picked up.

19. A device according to claim 4, wherein the operating one task controlled by the control means relates to managing and particularly to displaying on the touch-sensitive screen, alarms detected by the functional members, and in that one of the main control zones of the touch-sensitive screen is a zone for activating the displaying of the alarms picked up.

20. A device according to claim 5, wherein the operating one task controlled by the control means relates to managing and particularly to displaying on the touch-sensitive screen, alarms detected by the functional members, and in that one of the main control zones of the touch-sensitive screen is a zone for activating the displaying of the alarms picked up.

21. A device according to claim 2, further comprising measurement sensors for measuring the pressures prevailing in the pipes, wherein one task controlled by the control means relates to evaluating the values of measurements picked up by said measurement sensors and to displaying these values on the touch-sensitive screen, and in that one of said main control zones is a zone for activating the displaying on the touch-sensitive screen of the measurement values picked up.

22. A device according to claim 3, further comprising measurement sensors for measuring the pressures prevailing in the pipes, wherein one task controlled by the control means relates to evaluating the values of measurements picked up by said measurement sensors and to displaying these values on the touch-sensitive screen, and in that one of said main control zones is a zone for activating the displaying on the touch-sensitive screen of the measurement values picked up.

23. A device according to claim 4, further comprising measurement sensors for measuring the pressures prevailing in the pipes, wherein one task controlled by the control means relates to evaluating the values of measurements picked up by said measurement sensors and to displaying these values on the touch-sensitive screen, and in that one of said main control zones is a zone for activating the displaying on the touch-sensitive screen of the measurement values picked up.

24. A device according to claim 5, further comprising measurement sensors for measuring the pressures prevailing in the pipes, wherein one task controlled by the control means relates to evaluating the values of measurements picked up by said measurement sensors and to displaying these values on the touch-sensitive screen, and in that one of said main control zones is a zone for activating the displaying on the touch-sensitive screen of the measurement values picked up.

25. A device according to claim 6, further comprising measurement sensors for measuring the pressures prevailing in the pipes, wherein one task controlled by the control means relates to evaluating the values of measurements picked up by said measurement sensors and to displaying these values on the touch-sensitive screen, and in that one of said main control zones is a zone for activating the displaying on the touch-sensitive screen of the measurement values picked up.

26. A device according to claim 2, further comprising measurement sensors for measuring the pressures prevailing in the pipes, wherein the operating means comprise means for storing in memory a block diagram representing the series of pipes of the device for distributing the working gas the valves arranged in these pipes in that one task controlled by the control means relates to evaluating the values of measurements picked up by said sensors and to displaying on the touch-sensitive screen the block diagram of the distribution device, recorded in said memory-storage means, together with said values of the measurements picked up by the sensors, and in that one of said main control zones is a zone for activating the displaying on the touch sensitive screen of the block diagram together with the values of measurements picked up.

27. An installation for distributing a working gas, comprising:

a first and a second device for distributing working gas according to claim 2, which devices are arranged in series and whose command-control units communicate with each other, in that the second device is a functional member as far as the first device is concerned, in that one task of the control means of the first device relates to monitoring the operating status of the second device, which it considers as a functional member, and in that one of said main control zones of the touch-sensitive screen of the first device is a zone for activating the displaying on the touch-sensitive screen of the first device, of information regarding the operating status of the second device.

28. An installation for supplying a working gas, comprising:

at least one source of a working gas under pressure, this source being placed in an isolation cabinet;

a distribution device according to claim 2, connected to said at least one source and arranged in said isolation cabinet and in that the touch-sensitive screen of the distribution device is built into the exterior wall of said cabinet.

* * * * *